United States Patent [19]

Edler et al.

[11] Patent Number: 5,252,248
[45] Date of Patent: * Oct. 12, 1993

[54] PROCESS FOR PREPARING A BASE NITRIDABLE SILICON-CONTAINING MATERIAL

[75] Inventors: James P. Edler; Bondan Lisowsky, both of Troy, Mich.

[73] Assignee: Eaton Corporation, Cleveland, Ohio

[*] Notice: The portion of the term of this patent subsequent to Jul. 24, 2007 has been disclaimed.

[21] Appl. No.: 557,382

[22] Filed: Jul. 24, 1990

[51] Int. Cl.$^5$ ................................................ C09K 3/00
[52] U.S. Cl. .................... 252/182.32; 252/183.14
[58] Field of Search ........................ 252/182.32, 183.14

[56] References Cited

U.S. PATENT DOCUMENTS

| | | | |
|---|---|---|---|
| 2,268,589 | 1/1942 | Henny | 49/78.1 |
| 2,869,215 | 1/1959 | Smith | 25/156 |
| 3,205,080 | 9/1965 | Ryshkewitch | 106/44 |
| 3,222,438 | 12/1965 | Parr et al. | 264/66 |
| 3,669,723 | 6/1972 | Parr et al. | 117/105.2 |
| 3,819,786 | 6/1974 | Wells May | 264/63 |
| 3,887,412 | 6/1975 | Styhr et al. | 156/89 |
| 3,950,464 | 4/1976 | Masaki | 264/65 |
| 3,951,849 | 4/1976 | Vickery et al. | 252/309 |
| 3,991,166 | 11/1976 | Jack et al. | 423/327 |
| 3,992,497 | 11/1976 | Terwilliger et al. | 264/56 |
| 4,033,400 | 7/1977 | Gurwell et al. | 29/191.4 |
| 4,036,653 | 7/1977 | Jacobson | 106/47 R |
| 4,062,102 | 12/1977 | Lawrence et al. | 29/572 |
| 4,067,943 | 1/1978 | Ezis et al. | 264/86 |
| 4,119,689 | 10/1978 | Prochazka et al. | 264/65 |
| 4,164,528 | 8/1979 | Yajima et al. | 264/62 |
| 4,235,857 | 11/1980 | Mangels | 423/344 |
| 4,285,895 | 8/1981 | Mangels et al. | 264/65 |
| 4,354,990 | 10/1982 | Martinengo et al. | 264/65 |
| 4,356,136 | 10/1982 | Mangels | 264/65 |
| 4,376,742 | 3/1983 | Mah | 264/85 |
| 4,377,542 | 3/1983 | Mangels et al. | 264/65 |
| 4,388,080 | 6/1983 | Kapur et al. | 423/348 |
| 4,410,636 | 10/1983 | Minjolle et al. | 501/98 |
| 4,427,508 | 1/1984 | Lichtin | 204/157.1 R |
| 4,427,509 | 1/1984 | Lichtin | 204/157.1 R |
| 4,443,394 | 4/1984 | Ezis | 264/65 |
| 4,471,060 | 9/1984 | Dickie et al. | 501/151 |
| 4,477,493 | 10/1984 | Parkinson et al. | 427/228 |
| 4,519,967 | 5/1985 | Crosbie et al. | 264/86 |
| 4,781,874 | 11/1988 | Edler | 264/65 |
| 4,943,401 | 7/1990 | Edler et al. | 264/63 |

FOREIGN PATENT DOCUMENTS

| | | |
|---|---|---|
| 076549 | 6/1977 | Japan . |
| 081250 | 5/1983 | Japan . |
| 779474 | 7/1957 | United Kingdom . |

OTHER PUBLICATIONS

Sacks, et al., Properties of Silicon Suspensions and Slip-Cast Bodies, 1985, 1109-1123.
Jahn, Processing of Reaction Bonded Silicon Nitride, 1989, 1-24.
Williams, et al., Slip Casting of Silicon Shapes and Their Nitriding, 1983, pp. 607-619.
Mangels, Effect of Rate-Controlled Nitriding and Nitriding Atmospheres on the Formation of Reaction-Bonded $Si_3N_4$, 1981, pp. 613-617.
Moulson et al., Nitridation of High-Purity Silicon, 1975, pp. 285-289.
Shaw et al., Thermodynamics of Silicon Nitridation: Effect of Hydrogen, 1982, pp. 180-181.
Moulson, Reaction-bonded Silicon Nitride: its Formation and Properties, 1979, pp. 1017-1051.

*Primary Examiner*—Edward A. Miller
*Attorney, Agent, or Firm*—P. S. Rulon; L. E. Cargill

[57] ABSTRACT

A process for preparing a nitridable silicon-containing material, which process includes comminuting a slurry of silicon powder, and water, the comminuting performed to cause substantial chemical reaction between the silicon and the water. Reducing the water content of the reacted slurry forms a processable mass. In another embodiment, desired additives such as at least one nitriding agent may be added to aid any nitridation or other processing which may be performed thereafter.

13 Claims, No Drawings

PROCESS FOR PREPARING A BASE NITRIDABLE SILICON-CONTAINING MATERIAL

TECHNICAL FIELD

This invention relates generally to methods of preparing a nitridable silicon-containing material and more particularly relates to using silicon which has been chemically reacted with water. This application also relates to co-pending applications entitled Process For Making Silicon Nitride Articles; Process For Preparing A Nitridable Silicon-Containing Material Having At Least One Densification Aid Including Alumina, And The Material Resulting Therefrom; New Ceramic Phase In Sintered Silicon Nitride Containing Cerium, Aluminum, And Iron; Process For Preparing An Alpha-Phase Silicon Nitride Material And Thereafter Converting To Non-Densified Beta-Phase Material And The Material Resulting Therefrom; Process For Preparing A Densified Beta-Phase Silicon Nitride Material Having At Least One Densification Aid, And The Material Resulting Therefrom; and Process For Nitriding Silicon-Containing Materials.

BACKGROUND OF THE INVENTION

It has long been recognized that silicon nitride has particular utility with critically engineered applications, including, but not limited to engine components and cutting tools. In general, a single manufacturing facility fabricates completed silicon nitride powder and/or articles, requiring a great deal of investment, machinery, skilled labor, and facilities. It is anticipated that future facilities may necessitate the need of a starting material, i.e. one that has been preprocessed, so that end users may perform the final processing steps in order to achieve the manufactured item that they desire.

Reaction bonded silicon nitride is commonly prepared by reacting and nitriding the silicon (either as a powder or as a formed article) with nitrogen by exposing the silicon to a nitrogen-containing atmosphere at temperatures of 1100° C. to about 1420° C. for times sufficient to produce the silicon nitride. It is not uncommon for the nitriding time in prior art methods to be 100–200 hours. It is normal for a small amount of nitriding aid (e.g., iron oxide or nickel oxide) to be initially mixed with the silicon powder to enhance the nitridation of the silicon during the nitriding step.

As described in U.S. Pat. No. 4,943,401 to the present inventors, also assigned to Eaton, which is also incorporated herein by reference, a method is disclosed for producing a silicon nitride material by comminuting silicon powder with water. Further disclosed are a nitriding agent, a sintering aid, and the process for producing the silicon nitride from start to finish, through sintering.

It has been recognized by the present inventors that it may be advantageous to prepare a starting material for end users to facilitate certain processing steps at their plants. Therefore, it would be helpful if the end users would have a source of good starting material to which they would be able to add any nitriding agents, densification aids, or other desired additives to aid in their processing, which are relatively quick steps in relation to the relatively long step of preparing the nitridable silicon-containing starting material. As discussed above, prior art methods for producing silicon nitride take a very long time. The comminuting step as disclosed in U.S. Pat. No. 4,943,401 greatly reduces the processing time. It is envisioned that a bulk processing plant could produce the initially reacted silicon-containing material which is necessary for end processing, while selling various formulas and additives to be included with the comminuted slurry, or a resulting dry mass for particular applications.

Potential end processors would be able to purchase the nitridable silicon-containing starting material, along with various additives, including nitriding aids, densification aids, and other processing aids, such as lubricants, binders, and other organic materials, which would be able to produce a desired material tailor made for their application. The end user would not need to purchase all of the reaction equipment which is necessary for producing the nitridable silicon-containing material. Rather, they would be required to purchase a small mixer and could mix in any combination of additives which they may desire. Thereafter, they could form articles from the silicon-containing material and nitride them in their desired shape. Thereafter, as is well known in the art, they could sinter the material to form a densified silicon nitride material which is relatively high in strength.

It is widely known that if common sintering or densification aids for silicon nitride (e.g., magnesium oxide, yttrium oxide, aluminum oxide, rare earth oxides, etc.) are mixed in initially with the silicon powder, the reaction bonded silicon nitride article, provided it has a high alpha phase content, can be further heated immediately after nitriding to the higher sintering temperature and will thereby be sintered to increase its density and have improved mechanical properties as compared to the original reaction bonded silicon nitride article.

The article can be hot pressed, hot isostatically pressed, pressure assisted sintered, or pressureless sintered, and may be covered with a cover powder during the sintering process to prevent any degradation. Boron nitride or silicon nitride, or mixtures thereof are commonly employed as a cover powder over the article during sintering to minimize the decomposition of the reaction bonded silicon nitride article. During sintering, the alpha phase of the silicon nitride material is converted to the beta phase of silicon nitride.

Therefore, high levels of alpha phase silicon nitride need to be present in the pre-sintered reaction bonded silicon nitride to obtain the desired sintering response. In the past, it has been found that some methods produce a high beta phase material too early in the process to be useful. A sinterable silicon-containing starting material is generally in the form of alpha phase materials, if processed properly, although prior art methods have produced an undesirably high level of beta phase material. The following paragraphs describe prior art methods and materials for producing silicon nitride articles.

U.S. Pat. No. 3,206,318 to Yamauchi et al. teaches a method of nitriding metallic silicon which lowers the ill effects of the oxidation of silicon nitride, in which the nitriding catalyst is (a) at least one primary substance selected from the group consisting of metallic vanadium, the inorganic compounds thereof, and mixtures thereof; or (b) that comprising (a) in which has been incorporated at least one secondary substance, selected from the group consisting of metallic cobalt, manganese, chromium, copper, nickel, iron, barium, and calcium and the inorganic compounds thereof. Yamauchi, et al. also teach a refractory article in which granular refractory material, such as alumina, is bonded with silicon nitride. The patent furthermore teaches that the oxides of the metals, Cu, Co, Ni, Cr, Mn and V, may likewise be used and that the quantity of these oxides is suitably 0.1–2 moles in terms of the metallic element to 100 moles of the silicon.

U.S. Pat. No. 4,235,857, METHOD OF NITRIDING SILICON, to Mangels teaches that silicon can be nitrided using a demand nitriding cycle over the temperature range of 900° C. to 1420° C. in an atmosphere consisting of a mixture of nitrogen, hydrogen and helium. The chemical composition of the nitriding gas is constantly changing during the nitridation of the silicon article, with the chemical activity of the nitrogen decreasing (partial pressure of nitrogen in the furnace decreases) as the temperature increases. The examples cited by Mangles have nitriding times of from 130 to 175 hours.

U.S. Pat. No. 4,351,787 to Martinengo et al. teaches that sintered silicon nitride articles can be prepared by forming a silicon powder mixture containing one or more sintering additives into a compact, the additives being present in the powder in an amount such as to ensure an additive content of from 0.5 to 20 wt. % in the silicon nitride compact; heating the compact under a nitrogen gas blanket at a temperature not exceeding 1500° C. to convert the silicon into reaction bonded silicon nitride; and sintering the reaction bonded silicon nitride compact by heating in a nitrogen gas atmosphere at a temperature of at least 1500° C. Furthermore, it is taught that the silicon powder size is from 0.1 to 44 microns in size and of high purity or containing only very small amounts of nitriding catalysts. The Martinengo et al. patent teaches that any conventional sintering additive may be used. Best results are said to be achieved by using MgO, and especially in combination with $Y_2O_3$. Other preferred additives mentioned in the patent are MgO, $Y_2O_3$, $CeO_2$, $ZrO_2$, BeO, $Mg_3N_2$, and AlN. Other examples of additives are given as $Mg_2Si$, $MgAl_2O_4$, and rare earth additions such as $La_2O_3$. Also iron can be used with advantage, usually in mixture with conventional additives such as MgO, $Y_2O_3$, and $CeO_2$.

It is, therefore, a primary object of the present invention to provide an improved process for making a body of nitridable silicon-containing material which can later be processed as desired which is more commercially viable than prior art methods, uses materials which are readily available, and is processable in substantially less time than typical prior art methods.

SUMMARY OF THE INVENTION

In accordance with the preferred embodiment of the invention, these and other objects and advantages are addressed as follows. Methods are disclosed for preparing a silicon-containing material which is formed from less expensive and more readily available materials than prior art materials and which uses considerably less processing time than those used in prior art methods.

A method is disclosed for preparing a nitridable silicon-containing material which includes comminuting a slurry including a mixture of silicon powder and water. The comminuting is performed to form fresh, non-oxidized surfaces on the silicon powder and to allow substantial chemical reaction between the silicon and the water. One or more nitriding aids may also be mixed into the silicon-based slurry, whether by comminution or any standard mixing technique. Thereafter, the water content of the reacted slurry may be reduced to a degree sufficient to form a dry mass.

A method for preparing such a material begins with comminuting (i) a silicon-containing powder with (ii) water. A dispersing agent, such as Darvan No. 6, a registered trademark of the R. T. Vanderbilt Company, Inc. may be added initially to aid the comminution. Comminution of the operative chemical compounds with water is conducted for a period of 1 to 5 hours, to produce a silicon based slurry.

Organic additives such as binders, plasticizers, viscosity modifiers, and other dispersing agents may be added to the slurry at the beginning of the processing or toward the end of the comminution. The slurry may then be aged for a period of 12 to 24 hours to allow the reaction of the silicon with the water to substantially reach completion which is believed to provide a silicon oxyhydrate coating on the silicon. The aged slurry may then be dried by spray drying or any other suitable technique and formed into a green body, if desired, such as by compaction of the resultant spray-dried granules. Slip casting of the original slip, and extrusion, injection molding or any other known method for forming green ceramic bodies may likewise be employed after suitable formulation with appropriate processing aids, like binders.

In commercial franchise applications of this invention, nitridation and/or densification aids may be added before or after the silicon powder and water have been comminuted in order to suit the needs of the customer. It is envisioned that a customer would purchase this base starting material of nitridable silicon-containing material, whether or not it includes nitriding aids or densification aids, and individually purchase additives, such as whisker or particulate reinforcements, nitridation and/or densification agents, or any organic additives, and then process their desired products using the formulas as disclosed herein, or utilizing their own technology. As can be imagined by one of ordinary skill in the art, a customer may find it easier to purchase a base nitridable silicon-containing powder or slurry with nitriding aids included, and then select individual additives for their own purposes. Processing such as slip casting, injection molding, compaction, machining and sintering would take place on site in their facilities. That way the customer would not need to invest in the comminution equipment and they could concentrate on manufacturing a finished product instead of preparing the precursor materials. The inclusion of the additives may take place before the aging step or after. Densification aids may be added at any time during the procedure. It is not necessary for densification aids or the other additives to be comminuted with the silicon powder and the water.

DETAILED DESCRIPTION OF THE INVENTION

The processes of this invention generally include a process for preparing a nitridable silicon-containing material, as well as the material made therefrom. The material may be made in the form of a powder or an article. The process includes comminuting a slurry including a mixture of silicon powder and water, the comminuting being performed to form fresh, non-oxidized surfaces on the silicon powder and to allow substantial chemical reaction between the silicon powder and the water, and thereafter reducing the water content of the reacted slurry to a degree sufficient to form a dry mass.

In addition, certain desired additives such as nitriding aids, densification aids, organic binders and the like may be included. These additives may include at least one nitriding aids added at about 0.1 to 7 volume percent based upon the volume of the resultant dry mass to aid in any later nitriding process. The at least one nitriding aid may be selected from the group consisting of iron oxides, lead oxides, nickel carbonyl, nickel oxides, silicon carbide, graphite, carbon, aluminum oxides, $Fe_2O_3$, NiO, CoO, CaF, PbO, $Li_2O$, $Na_2O$, $K_2O$, BaO, BN, albite ($NaAlSi_3O_8$), orthclase ($KAlSi_3O_8$), anorthite ($CaAl_2Si_2O_8$), nepheline syenite, talc, borax, soda ash, $Pb_3O_4$, alpha-phase $Si_3N_4$ and mixtures thereof.

The slurry components are preferably employed in amounts such that the slurry contains about 10 to about 60 volume percent solids and about 90 to 40 volume percent water, where the total volume percent equals 100 percent, while the solids consist of the silicon powder and the desired additives.

In yet another embodiment of this present invention, the desired additives may be added after the silicon powder and water have been comminuted. The additions may take place before the aging step or after. The additives may be added at any time during the procedure. It is not necessary for the additives to be comminuted with the silicon powder and the water.

The process of this invention relating to the making of powders and bodies generally begins with comminuting silicon powder in the presence of a large amount of water to form a slurry. The silicon powder may be commercial-grade and preferably has a particle size of less than 20 micrometers. A viscosity modifier, or dispersing agent, such as Darvan No. 1 or 6, a registered trademark of R. T. Vanderbilt Co., may be advantageously added to the slurry to aid the comminution. Comminution is carried on for about 1 to 5 hours, although longer or shorter times may be appropriate in certain equipment.

For comminuting, any suitable comminution device may be used such as a ball mill, rod mill, vibratory grinder, Union Process grinder, jet mill, cone grinder, jaw crusher, and hammer mill. The slurry is preferably prepared in a ball mill which is 25–50 volume % filled with milling media and 25–50 volume % filled with the slurry.

The comminuting of the silicon in the presence of water is an important step, as it is believed that the comminuting creates fresh, unoxidized surfaces on the silicon powder particles for vigorous reaction with the water. Merely mixing silicon powder, whether or not pre-ground, with water does not appear to create the fast, vigorous reaction that comminuting provides. Pre-ground silicon powder is not as reactive toward water because silicon, being a highly reactive metal, readily oxidizes in air during storage. Thus, a passivating layer of silicon oxide is formed on the outside of the silicon particles, thereby rendering the silicon not nearly as reactive as unoxidized silicon such as is created during the comminution step.

After comminuting, the slurry may be allowed to react further by aging. It is believed that the silicon is chemically reacting with the water during the aging step to form a silicon oxyhydrate coating on the silicon particles and also releasing hydrogen gas as a product of the reaction. During aging, the slip appears to increase in volume by at least 50%, typically doubling its volume through frothing, and, subsequently, the frothing subsides after about 12 hours as the reaction nears completion and the slip develops thixotropic properties.

After aging, the reacted slurry is dried and formed, if desired, in preparation for a subsequent nitriding step. Although the slurry could be slip cast at this point to form a green body or dried for further formulation and use in extrusion or injection molding of shapes, it is preferred to spray dry the slip to obtain a free-flowing powder for isopressing or dry compression forming using standard powder metal presses. At this point, the powder may be shipped to a customer so that they can process the powder further for their exact desires. If binders are included, the compact will have a sufficient strength to allow machining without the need for special heat treatments by partially nitriding or sintering the silicon compact. Preferably, required machining is completed on the silicon green body prior to nitriding, rather than on the harder silicon nitride part.

Thus, there is provided in accordance with the present invention a method for preparing a nitridable silicon-containing material which uses starting materials that are less expensive and more readily available than prior art materials.

The following examples are illustrative only of various possible recipes and their resulting properties, and should not be construed as limiting the invention which is properly delineated in the appended claims.

EXAMPLES

Because strength testing cannot be done on the powder material of the present invention, tests were performed on various possible end products which would be made by the customers with their own particular processing or formulation. The following examples illustrate the use of various nitriding aids and the inclusion of densification aids with the silicon powder to show the results of anticipated end products. Some examples describe the combination of iron oxide, yttria, and alumina as liquid forming agents which aid in the densification during sintering.

EXAMPLE 1

Three kilograms of commercial-grade silicon (99% silicon minimum) of size 2.03 Fisher Average Diameter was comminuted with 90 grams iron oxide ($Fe_2O_3$), 300 grams yttria ($Y_2O_3$), 100 grams of alumina ($Al_2O_3$), and 2500 milliliters of distilled water. Comminution was continued for 4 hours in an 11.3 liter porcelain jar mill with 7 kilograms of $\frac{3}{4}$ inch alumina balls. The mill was vented hourly to prevent excessive pressure build-up in the mill. At the conclusion of the comminuting period, organic binders and viscosity modifiers consisting of 45 grams of polyvinyl alcohol, 15 grams of polyethylene glycol, 30 grams of glycerol, and 7.5 grams of xanthan gum were added to the mill and comminution continued for an additional hour, so that the silicon was comminuted with the distilled water for a total time of 5 hours. The slurry was separated from the milling balls and allowed to age for 16 hours. The aged slurry was spray-dried to a free-flowing powder using a PENTRONIX dryer with an atomizer wheel speed of 8000 rpm, an inlet temperature of 275° C. and an outlet temperature of 100° C. Total drying was approximately 1 hour.

The spray-dried powder was consolidated into modulus of rupture (MOR) bars having dimensions of approximately 0.140 inches by 0.375 inches by 3.5 inches. These bars were shortened to 2.25 inches prior to nitriding. The bars were then placed in a nitriding furnace, which was evacuated to remove the ambient atmosphere. Then the furnace was backfilled with hydrogen gas, which was also flowed continuously through the furnace. The temperature of the furnace was raised from room temperature to 1000° C. over approximately a 2-hour period at a linear rate. At approximately 1000° C, the hydrogen atmosphere was first replaced by nitrogen, and then replaced by a nitriding atmosphere which consisted approximately of a mixture of 50 mole % helium, 2 mole % hydrogen, and 48 mole % nitrogen gases. After holding the temperature at 1000° C. for one hour, the temperature was linearly raised to 1410° C. over a 35-hour period, ending with an additional 1-hour hold at 1410° C. Nitrogen gas was automatically added to the furnace to maintain the nitrogen concentration, as the nitrogen was consumed by the silicon during the conversion of the silicon to silicon nitride. The bars were then cooled to room temperature.

Ten (10) of the MOR bars were placed on reaction bonded silicon nitride (RBSN) supports, in an RBSN setter boat and covered with silicon nitride powder which contained yttria ($Y_2O_3$). The setter boat was covered with reaction bonded silicon nitride plates to prevent reaction with the atmosphere of the sintering furnace. The setter boat containing the bars was placed in a graphite furnace which had been evacuated and purged with argon under vacuum. The furnace temperature was increased from room temperature to a temperature of 1420° C. over a 2-hour time period. At approximately 700° C, the vacuum was replaced with a nitrogen atmosphere at a pressure of approximately 40 psig. The temperature was further increased to 1740° C. over an additional 5 hours and held at 1740° C. for 4 hours. The bars were then cooled to room temperature over an 8-hour time period.

The 10 bars were ground into test bars by Bomas Machine Specialties, Sommerville, Mass., and then tested in 4-point bending at Coors Analytical Laboratories, Golden, Colo. The test results are shown as Example 1 in Table I.

EXAMPLE 2

Using the spray-dried powder of Example 1, six modulus of rupture bars were prepared by die pressing. The modulus of rupture bars were then nitrided by placing them in a furnace and increasing the temperature of the furnace linearly from room temperature to 1000° C. in 2 hours, while flowing hydrogen through the furnace.

Once the furnace temperature reached 1000° C., the atmosphere in the furnace was replaced with a nitriding gas of 50 mole % He, 2 mole % $H_2$ and 48 mole % $N_2$. The furnace temperature was then held at 1000° C. for 1 hour, then, linearly, the temperature was increased from 1000° C. to 1354° C. over 24 hours. The furnace temperature was held at 1354° C. for 7 hours, then allowed to cool to room temperature. The bars were then reheated in the nitriding furnace from room temperature to 1300° C. over a 2 hour period under an atmosphere of 50 mole % He, 2 mole % $H_2$, and 48 mole % $N_2$. The furnace temperature was then increased to 1435° C. using a linear temperature ramp over a 9½-hour period, with a temperature hold at 1435° C. for 1 hour before cooling to room temperature.

The 6 MOR bars were packed in an RBSN setter and covered with silicon nitride cover powder which contained yttria, and the assembly was covered with an RBSN plate. This assembly was heated under vacuum in a graphite furnace from room temperature to 1340° C. over a 2-hour period. The furnace was purged three times with argon while the furnace was at room temperature and purged twice with argon during the initial heating of the furnace. At approximately 1400° C., the furnace was pressurized to 40 psig with nitrogen gas, and remained pressurized until the conclusion of the sintering cycle. The furnace temperature was raised linearly from 1340° C. to 1810° C. over a 5-hour period and held at 1810° C. for 2½ hours. Then the furnace was cooled to room temperature over a 5-hour period. The MOR bars were easily removed from the cover powder and were then ground into test bars by Bomas Machine Specialties. Six bars were tested in 4-point bending at Coors Analytical Laboratories, with the results given as Example 2 in Table I.

EXAMPLE 3

1000 grams of silicon, 30 grams of iron oxide ($Fe_2O_3$), 40 grams alumina ($Al_2O_3$), 200 grams of 96% ceria (Molycorp grade 5310 $CeO_2$) and 1000 milliliters of distilled water were comminuted in an 11.3 liter porcelain jar mill using 7 kg of ¾ inch diameter alumina balls for 3 hours. Then organic binders and viscosity modifiers consisting of 15 grams of polyvinyl alcohol, 5 grams of polyethylene glycol, 10 grams of glycerol, and 2.5 grams of xanthan gum and 270 ml of distilled water were added to the mill, and comminution was continued for an additional hour before the slurry was separated from the balls. Total comminution time of the silicon with the water was 4 hours. Two additional batches of the silicon-ceria-iron oxide-alumina-water slurry were prepared in an identical manner, and the slurries were combined and allowed to age for approximately 16 hours. The combined slurries were then spray-dried to obtain a free-flowing granular powder using a Pentronix Dryer, operated at a rotor speed of 8200–8300 rpm, an inlet temperature of 295° C, and an outlet temperature of 90° C.

The ceria used was about 96% pure ceria and about 4% other rare earth oxides, principally lanthanum oxide (typically about 3%) and neodymium oxide (typically about 1.5%). Since these oxides would also constitute appropriate liquid forming agents and have densities similar to ceria, the slight error incurred by ignoring their presence was considered negligible.

The spray-dried powder was then pressed into modulus of rupture (MOR) test bars of dimension 0.375 inches by 0.170 inches by 3.5 inches using an industry-standard powder metal press. The bars were subsequently cut to approximately 2.5 inches prior to nitriding.

The 2.5-inch bars were then placed in a nitriding furnace which was evacuated to remove the ambient atmosphere. The furnace was then backfilled with hydrogen gas, which also flowed continuously through the furnace. The temperature of the furnace was raised from room temperature to 1000° C. over approximately 2 hours at a linear rate. At approximately 860° C., the hydrogen atmosphere was replaced by a nitrogen purge, and then the furnace was evacuated until 1000° C. was reached. At 1000° C., a nitriding atmosphere consisting of approximately 50 mole % helium, 2 mole % hydrogen, and 48 mole % nitrogen was used to fill the furnace. The temperature was increased linearly from 1000° C. to 1440° C. over a 32-hour period, with an additional 1 hour hold at 1440° C.

During nitridation, nitrogen gas was automatically added to the furnace as needed to maintain the original nitrogen concentration because nitrogen was consumed by the silicon during the conversion of the silicon to silicon nitride. The bars were then cooled to room temperature.

Eight of the MOR bars were placed in a reaction bonded silicon nitride setter box of the type described in the co-pending application "Use of RBSN Setters For The Sintering Of Silicon Nitride Ceramics As An Alternative For Cover Powder". The MOR bars were supported on RBSN supports within the setter boxes, and no cover powder was employed. The box with the MOR bars was placed in a graphite furnace. Several purges of the furnace with nitrogen gas was then performed. The furnace was then heated under vacuum to 500° C., and nitrogen gas was flowed at a very slow rate through the furnace so that the pressure in the furnace was maintained at approximately atmospheric for the rest of the sintering cycle. The heating of the furnace from room temperature to 1730° C. was accomplished at a linear rate over a 3-hour period. The furnace temperature was then held constant at 1730° C. for 4 hours, and allowed to cool to room temperature over a 3-hour period. The sintered bars were removed from the RBSN setter box and showed no tendency to adhere to the RBSN supports in the box. The MOR bars were sent to Bomas Machine Specialties for grinding into test bars, which were tested in 4-point MOR at Coors Analytical Laboratories. The test results are shown in Table I as

EXAMPLE 3

TABLE I

| Example | Density Avg. (gm/cc) | M.O.R. Avg. (Kpsi) | MOR Range (Kpsi) | # of Bars |
|---|---|---|---|---|
| 1 | 3.17 | 59.6 | 52.5–68.9 | 10 |
| 2 | 3.16 | 68.4 | 51.3–77.2 | 6 |
| 3 | 3.31 | 68 | 64–78 | 8 |

While our invention has been described in terms of a few specific examples of possible end products and configurations, it will be appreciated that other forms, formulations and applications for the powder could readily be adapted by one skilled in the art. Accordingly, the scope of our invention is to be considered limited only by the following claims.

What is claimed is:

1. A process for preparing a nitridable silicon-containing material, comprising:
   (a) forming an aqueous slurry of silicon powder and comminuting said silicon powder while suspended therein:
   (b) said comminuting being performed in a comminution device to form fresh, non-oxidized surfaces on the silicon powder, whereby substantial evolution of hydrogen gas and frothing occurs due to a chemical reaction which takes place between the silicon and the water to form a nitradable silicon-containing material which contains at least silicon and a compound selected from the group consisting of silicon oxyhydrate and silicon-water reaction products; and
   (c) venting the evolved hydrogen gas to prevent excessive pressure build-up.

2. The process of claim 1, further comprising a step of aging the aqueous slurry of comminuted powder in the absence of comminuting for a period of time sufficient to allow the chemical reaction to substantially reach completion as indicated by subsiding of the evolution of hydrogen gas and frothing.

3. The process of claim 1, further comprising a step of reducing the water content of the reacted slurry to a degree sufficient to form a dry mass which may thereafter be nitrided.

4. The process of claim 3, wherein said reduction of water content is accomplished by spray drying.

5. The process of claim 3, wherein said reduction of water content is accomplished by slip casting.

6. A process for preparing a nitridable silicon-containing material, comprising:
   (a) forming an aqueous slurry of silicon powder and at least one nitriding aid, and comminuting said silicon powder and said at least one nitriding aid while suspended therein;
   (b) said comminuting being performed in a comminution device to form fresh, non-oxidized surfaces on the silicon powder, whereby substantial evolution of hydrogen gas and frothing occurs due to a chemical reaction which takes place between the silicon and the water; and
   (c) venting the evolved hydrogen gas to prevent excessive pressure build-up.

7. The process of claim 6, further comprising a step of reducing the water content of the reacted slurry to a degree sufficient to form a dry mass which may thereafter be nitrided.

8. The process of claim 6, wherein said at least one nitriding agent is selected from the group consisting of iron oxides, lead oxides, nickel carbonyl, nickel oxides, silicon carbide, carbon, aluminum oxides, CoO, CaF, $Li_2O$, $Na_2O$, $K_2O$, BaO, BN, albite ($NaAlSi_3O_8$), orthclase ($KAlSi_3O_8$), anorthite ($CaAl_2Si_2O_8$), nepheline syenite, talc, borax, soda ash, alpha-phase $Si_3N_4$ and mixtures thereof.

9. The process of claim 6, wherein said at least one nitriding aid is included in the aqueous slurry of comminuted powder at about 0.1 to 7 volume percent based on the volume of the resulting nitridable silicon-containing material on a dry basis.

10. The process of claim 6, further comprising a step of aging the aqueous slurry of comminuted powder in the absence of comminuting for a period of time sufficient to allow the chemical reaction to substantially reach completion as indicated by subsiding of the evolution of hydrogen gas and frothing.

11. The process of claim 7, wherein said step of reducing the water content of the reacted slurry is accomplished by spray drying.

12. The process of claim 7, wherein said step of reducing the water content of the reacted slurry is accomplished by slip casting.

13. A process for preparing a nitridable silicon-containing material, comprising:
   (a) forming an aqueous slurry of silicon powder and at least one nitriding aid, and comminuting said silicon powder and said at least one nitriding aid while suspended therein;
   the at least one nitriding aid, being included in the slurry in an amount to achieve about a total 0.1 to 7 volume percent based on the volume of the resulting nitridable silicon-containing material on a dry basis,
   the slurry components being included in amounts such that the slurry contains about 10 to 60 volume percent of the silicon powder and the at least one nitriding aid and about 90 to 40 volume percent of water based on the total volume of the slurry, said comminuting being performed in a comminution device to form fresh, non-oxidized surfaces on the silicon powder, whereby substantial evolution of hydrogen gas and frothing occurs due to a chemical reaction which takes place between the silicon and the water;

(b) aging the aqueous slurry of comminuted powder in the absence of comminuting for a period of time sufficient to allow the chemical reaction to substantially reach completion as indicated by subsiding of the evolution of hydrogen gas and frothing; and (c) reducing the water content of the reacted slurry to a degree sufficient to form a dry mass which may then be nitrided.

* * * * *